United States Patent [19]

Taylor

[11] Patent Number: 4,574,233

[45] Date of Patent: Mar. 4, 1986

[54] HIGH IMPEDANCE CURRENT SOURCE

[75] Inventor: Stewart S. Taylor, Beaverton, Oreg.

[73] Assignee: Tektronix, Inc., Beaverton, Oreg.

[21] Appl. No.: 595,227

[22] Filed: Mar. 30, 1984

[51] Int. Cl.[4] .................................... G05F 3/26

[52] U.S. Cl. .................................... 323/316; 323/315

[58] Field of Search ............... 323/299, 311, 312, 315, 323/316

[56] References Cited

U.S. PATENT DOCUMENTS

| | | | |
|---|---|---|---|
| 3,962,592 | 6/1976 | Thommen et al. | 323/315 |
| 4,037,120 | 7/1977 | Colardelle et al. | 323/315 |
| 4,435,678 | 3/1984 | Joseph et al. | 323/315 |

FOREIGN PATENT DOCUMENTS

| | | | |
|---|---|---|---|
| 68946 | 6/1977 | Japan | 323/315 |
| 7556 | 1/1979 | Japan | 323/312 |
| 37719 | 3/1983 | Japan | 323/315 |
| 915066 | 3/1982 | U.S.S.R. | 323/315 |

OTHER PUBLICATIONS

Vojnovic, "Accurate Voltage-Controlled Constant Current Source", New Electron, (G.B.), vol. 11, No. 4, p. 23, Feb. 21, 1978.

*Primary Examiner*—William H. Beha, Jr.

*Attorney, Agent, or Firm*—John Smith-Hill; Clark A. Puntigam

[57] ABSTRACT

A current source circuit includes a first transistor (11) having an output current which is sensed across a resistance connected between the emitter of the first transistor (11) and the negative side of the supply voltage. A series negative feedback loop comprising transistors (13, 15) is connected between the emitter of first transistor (11) and the base of first transistor (11). The transistors (11, 13 and 15) and the other circuit components are selected so as to result in an incremental output resistance approaching that of a cascode current source, while having a voltage drop across the circuit of substantially less than 1 volt.

3 Claims, 2 Drawing Figures

HIGH IMPEDANCE CURRENT SOURCE

DESCRIPTION

1. Technical Field

This invention relates generally to the art of electrical current sources and more specifically concerns a current source implemented in the form of an electrical circuit having a particular feedback arrangement such that the circuit has a high output impedance with a relatively low voltage drop across the circuit. It should be understood that the term "current source" as used in this application covers both negative and positive current circuit implementations, which could otherwise be referred to, respectively, as a current source or current sink.

2. Background of the Invention

A desirable characteristic of current source circuits is a high incremental output resistance. This improves the accuracy for the output signal and results in a high voltage gain for the circuit if the circuit is used as an active load in an amplifier. Another desirable characteristic of current sources is a small voltage drop across the circuit. This objective is particularly important where the amount of supply voltage available is limited. Typically, present circuit design techniques utilize smaller capacity power supplies then heretofore, and therefore it is usually important that circuits be designed and implemented so as to minimize power requirements.

Accordingly, the present invention is a current source circuit which is characterized by a high incremental output impedance, and a relatively small voltage drop, thus accomplishing both of the above objectives in one circuit. Further, the circuit is designed such that the voltage at the output of the current source can closely approach the value of the voltage to which the circuit is referenced. Hence, if the circuit is implemented as part of an amplifier, the voltage waveform at the output of the amplifier can closely approach the power supply potential.

DISCLOSURE OF THE INVENTION

Accordingly, the present invention is a current source having a high output impedance which comprises a first transistor means which produces an output signal, a means for sensing changes in the output current of the first transistor, and feedback means, associated with said sensing means, arranged so that the incremental output impedance of the current source is relatively high and the operating voltage across the current source is substantially less than 1 volt.

BEST MODE FOR CARRYING OUT THE INVENTION

Figure 1:
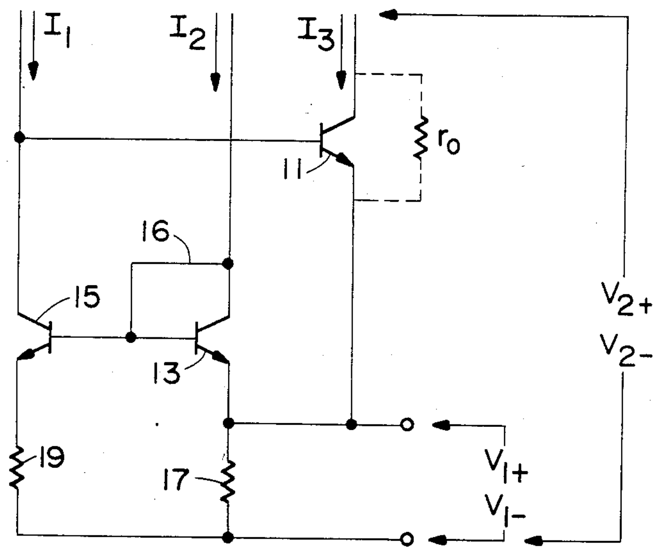
FIG. 1 is a schematic diagram of one embodiment of the circuit of the present invention.

FIG. 1 shows the circuit of the present invention implemented with NPN transistors. It should be understood that the invention could be also implemented with PNP transistors, in which case the direction of current flow shown in FIG. 1 would be in the opposite direction. Still further, the circuit could also be implemented with field-effects transistors including, for example, JFETS, MOSFETS, GaAsFETS and MESFETS, or a combination of bipolar and field-effect transistors. The circuit of FIG. 1 includes three transistors 11, 13 and 15. The circuit is arranged so that transistors 13 and 15 form a series sensing negative feedback loop for transistor 11, in which the output current of transistor 11 is sampled. Basically, the transistors and the other components in the circuit are selected so as to provide a sufficient loop gain that there exists a high incremental output impedance of the circuit, while at the same time, the voltage drop $V_2$ across the circuit is relatively low, thus allowing maximum utilization of the power supply.

Referring in detail to the embodiment shown in FIG. 1, the emitter of transistor 11 is connected to the emitter of transistor 13 and the top of resistor 17. The bottom of resistor 17 is connected to the negative side of the supply voltage $V_2$. The base of transistor 11 is connected to the collector of transistor 15. The base of transistor 15 is connected directly to the base of transistor 13, and also is connected to the collector of transistor 13 through connection line 16. The emitter of transistor 15 is connected through a resistor 19 to the bottom of resistor 17. In the embodiment shown $r_o$ is the incremental output impedance, collector to emitter, of transistor 11. Since the implementation shown in FIG. 1 is in NPN transistors, positive current flows into the collector of each transistor, denoted as $I_1$, $I_2$ and $I_3$, respectively.

In operation, the current $I_3$, which flows from the collector to the emitter and through $r_o$ of transistor 11, also flows through resistor 17. A change in voltage at the collector of transistor 11, such as would occur in the voltage swing of a reference supply voltage or output of an amplifier, will result in a change in current through $r_o$ and resistor 17. In the embodiment shown, transistor 13 essentially functions as a diode matched to transistor 15 and the change in voltage which is present at the top of resistor 17 is also present at the base of both transistors 13 and 15. Thus, any change in the voltage at the top of resistor 17, caused by a change in the current therethrough, will also result in a change in voltage at the base of transistors 13 and 15. This change in the base voltage of transistors 13 and 15 results in a change in the collector current of transistor 15, and hence a change in the base current of transistor 11, completing the feedback path from the emitter of transistor 11 through transistors 13 and 15 back to the base of transistor 11.

As indicated above, the circuit components are selected so that the loop gain of the circuit is such as to produce a relatively high incremental output impedance, which in the embodiment shown is approximately equal to that of a cascode implementation, i.e. approximately $\beta(V_A/I_c)$, where $\beta$ is the incremental forward current gain, $\Delta I_c/\Delta I_B$, $V_A$ is the Early voltage, $I_c$ is the DC collector current, and $I_B$ is the DC base current.

Assuming $\beta=\infty$, and that all the transistors operate in the forward active region, and knowing that the thermal voltage ($V_T$) is 26 mv at 300 degrees K, then $$I_3 = I_1\frac{R_1}{R_2} - I_2 + \frac{V_T}{R_2}\ln\frac{I_1 I_{S1}}{I_2 I_{S2}}$$

where $I_{S1}$ and $I_{S2}$ are the saturation currents of transistors 15 and 13, respectively, and $R_1$ and $R_2$ refer to resistors 17 and 19, respectively, in the circuit of FIG. 1. If transistors 13 and 15 are monolithically integrated on the same die, then $I_1I_{S1}$ can be chosen to equal $I_2I_{S2}$. Under those circumstances $$I_3 = I_1\frac{R_1}{R_2} - I_2, \text{ and } R_1 = R_2\frac{(I_2 + I_3)}{I_1}.$$

In the case where it is desired that $I_3=1$ ma and $I_1$ is chosen to be equal to $I_2$, then $R_1=2R_2$. The selection of the value of $R_1$ depends on the loop gain desired. The loop gain of the circuit, T, equals approximately $$\beta R_2\frac{gm1}{1 + gm1R_1}$$

which in turn equals approximately $\beta(R_2/R_1)$, so that $T\cong\beta/2$ if $gm1R_1>>1$. The incremental output impedance of the circuit $R_o$ would thus equal approximately $r_o(1+T)$, which in turn equals approximately $r_o\beta/2$. To assure that $gm1R_1$ is significantly greater than 1, $R_1$ must be significantly greater than 1/gm1 and hence greater than $V_T/I_2=26\Omega$.

A reasonable choice for $R_1$ thus would be 100Ω, so $R_2=50\Omega$ and the voltage (V) across resistor 17 equals $I_1R_1$ or 100 mv. In another example, if $I_3$ was selected to be 2 ma, and $I_2$ and $I_1$ were selected to be 1 ma and 3 ma, respectively, $R_1=R_2=20\Omega$, V=60 mv, and $T\cong\beta$.

In both of the above examples, the voltage drop $V_1$ across resistor 17 is relatively small, substantially less than 1 volt. This allows $V_2$ to also be small, enabling the circuit to perform over a broader and more useful range of voltages. The voltage across resistor 19 can be 100 mv or less and the current source can have high output impedance. Further, when transistors 13 and 15 have similar characteristics, so that the base emitter voltage drop of transistor 15 is offset by the base emitter voltage drop of transistor 13, the voltage drop across resistor 19 can be quite small, on the order of tens of millivolts, although this is usually not important, as long as transistor 15 does not saturate.

The above examples compare very favorably relative to the voltage drop in the emitter circuits of conventional current sources of several volts or more ($V=I_cR_E=100\ V_T=2.6$ volts, where $R_E$=the value of the emitter resistor) for an output impedance approaching a cascode implementation ($R_o\cong\beta V_A$). Attempts have previously been made in the art to reduce the voltage drop, such as with a Wilson current source implementation, but even with such circuits, the drop is still only slightly less than 1 volt, significantly greater than that of the present invention.

Thus, the present circuit has a relatively high output impedance, with a small voltage drop, so that circuits using such a current source can be implemented with smaller voltage supplies and/or operate with a larger output voltage swing, which are significant advantages in contemporary circuit design. Such a circuit has a potentially wide range of applications, including, for example, amplifier circuits, sweep circuits and trigger circuits.

Figure 2:
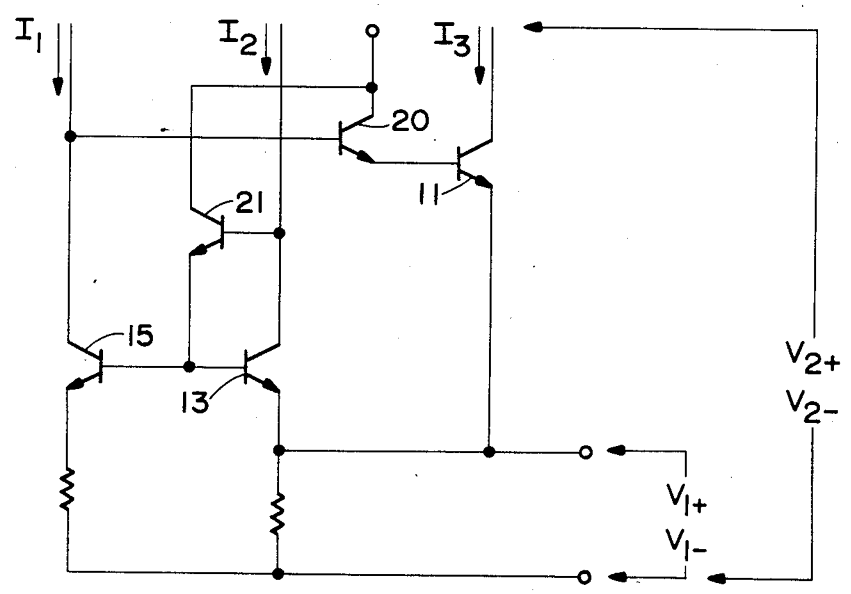
FIG. 2 is a schematic diagram of another embodiment of the circuit of the present invention, including a portion thereof designed to reduce base current errors in the circuit of FIG. 1.

FIG. 2 shows the circuit of FIG. 1 with two additional transistors 20 and 21. The same numerals in FIG. 1 are used in FIG. 2. The above circuit analysis with respect to FIG. 1 assumed a base current of approximately 0. In actuality, however, there usually is some base current, which reduces the accuracy of the analysis. Transistors 20 and 21 operate to reduce the base current by a factor of $\beta+1$. Otherwise, the circuit of FIG. 2 operates the same as described with respect to FIG. 1.

Although a preferred embodiment of the invention has been disclosed herein for illustration, it should be understood that various changes, modifications and substitutions may be incorporated in such embodiment without departing from the spirit of the invention as defined by the claims which follow.

I claim:

1. A current source having a high output impedance, comprising:
   - a first bipolar transistor for producing an output current at its collector;
   - a first resistor connected between the emitter of the first transistor and a reference potential level, whereby the potential at the emitter of the first transistor is representative of the output current of the first transistor;
   - a second bipolar transistor having its emitter connected to the emitter of the first transistor and its base coupled to its collector;
   - a third bipolar transistor having its base connected to the base of the second transistor and its collector coupled to the base of the first transistor; and
   - a second resistor connected between the emitter of the second transistor and said reference potential level,
   - whereby when the collectors of the second and third transistors are connected to first and second constant current sources respectively, changes in the potential at the emitter of the second transistor bring about corresponding changes in the potential at the base of the third transistor, and changes in the potential at the base of the third transistor bring about changes in the base current of the first transistor.

2. A current source according to claim 1, wherein the base of the second transistor is connected directly to its collector and the collector of the third transistor is connected directly to the base of the first transistor.

3. A current source according to claim 1, comprising a fourth bipolar transistor having its base connected to the collector of the third transistor, its emitter connected to the base of the first transistor and its collector connected to a second reference potential source, and a fifth bipolar transistor having its base connected to the collector of the second transistor, its emitter connected to the base of the second transistor and its collector connected to the collector of the fourth transistor.

* * * * *